United States Patent
Credé

(10) Patent No.: US 11,602,807 B2
(45) Date of Patent: Mar. 14, 2023

(54) DEVICE AND METHOD FOR WELDING HARD MATERIAL ELEMENTS ONTO TEETH OF A SAW BLADE

(71) Applicant: Credé Vermoegensverwaltungs-GmbH + Co. KG, Pforzheim (DE)

(72) Inventor: Marcel Credé, Pforzheim (DE)

(73) Assignee: CREDE VERMOGENSVERWALTUNGS-GMBYH + CO. KG, Pforzheim (DE)

( * ) Notice: Subject to any disclaimer, the term of this patent is extended or adjusted under 35 U.S.C. 154(b) by 509 days.

(21) Appl. No.: 16/638,305

(22) PCT Filed: Aug. 1, 2018

(86) PCT No.: PCT/EP2018/070867
§ 371 (c)(1),
(2) Date: Feb. 11, 2020

(87) PCT Pub. No.: WO2019/034428
PCT Pub. Date: Feb. 21, 2019

(65) Prior Publication Data
US 2020/0223016 A1    Jul. 16, 2020

(30) Foreign Application Priority Data
Aug. 16, 2017 (DE) .................... 10 2017 118 707.3

(51) Int. Cl.
*B23K 31/00* (2006.01)
*B23K 37/00* (2006.01)
(Continued)

(52) U.S. Cl.
CPC ............ *B23K 31/025* (2013.01); *B22D 19/06* (2013.01); *B23K 11/002* (2013.01); *B23K 2101/20* (2018.08)

(58) Field of Classification Search
CPC .... B23K 31/025; B23K 2101/20; B23K 3/08; B23K 37/0443
See application file for complete search history.

(56) References Cited

U.S. PATENT DOCUMENTS 3,063,310 A    11/1962   Connoy
3,340,378 A     9/1967   Miller
(Continued)

FOREIGN PATENT DOCUMENTS

WO         9219408 A1    11/1992
WO      2015140345 A1     9/2015

OTHER PUBLICATIONS

English language Abstract of WO9219408.

*Primary Examiner* — Erin B Saad
(74) *Attorney, Agent, or Firm* — Ware, Fressola, Maguire & Barber LLP

(57) ABSTRACT

The invention relates to a device (2) for welding hard material elements (4) onto teeth (6) of a saw blade (8), comprising a saw blade feed device (12) for moving the saw blade (8) in a feed direction (14), such that a tooth (6a) of the saw blade (8) can be brought into a target position (16) in a working region (10) of the device (2), comprising a first centering device (30) for centering the saw blade (8) transversely to the feed direction (14), comprising a second centering device (32) for centering a respective hard material element (4) transversely to the feed direction (14), comprising a resistance welding device (24) having a welding electrode (26) that can be deployed into and withdrawn from the working region (10), comprising a supply device (28) for supplying and transferring a respective hard material element (4) to the welding electrode (26), and it being possible for the welding electrode (26) to be deployed in such a way that the hard material element (4) can be brought toward the tooth (6a) to abut the tooth (6a). According to the (Continued)

invention, the hard material element (4) can be centered relative to the centered and fixed saw blade (8) by means of the second centering device (32), and the first and second centering device (30) are provided in a common assembly (38), such that the centering of the saw blade (8) by the first centering device (32) predetermines a centering position for the subsequent centering of the hard material element (4) by the second centering device (32).

20 Claims, 8 Drawing Sheets

(51) Int. Cl.
*B23K 31/02* (2006.01)
*B22D 19/06* (2006.01)
*B23K 11/00* (2006.01)
*B23K 101/20* (2006.01)

(56) References Cited

U.S. PATENT DOCUMENTS

| | | | | |
|---|---|---|---|---|
| 3,674,083 | A * | 7/1972 | Stier | B22F 9/00 |
| | | | | 164/334 |
| 3,740,521 | A * | 6/1973 | Bullard | B23K 31/025 |
| | | | | 219/86.22 |
| 3,960,310 | A * | 6/1976 | Nussbaum | B23D 65/00 |
| | | | | 228/49.1 |
| 4,110,591 | A * | 8/1978 | Trinchera | B23K 31/025 |
| | | | | 228/52 |
| 4,864,896 | A * | 9/1989 | Pfaltzgraff | B23K 31/025 |
| | | | | 76/112 |
| 5,040,436 | A * | 8/1991 | Pfaltzgraff | B23D 65/00 |
| | | | | 76/112 |
| 2017/0136568 | A1* | 5/2017 | Kundrat | B23D 65/00 |
| 2020/0223016 | A1* | 7/2020 | Credé | B22D 19/06 |
| 2021/0170531 | A1* | 6/2021 | Credé | B23K 31/025 |
| 2021/0260674 | A1* | 8/2021 | Maeda | B23K 11/087 |
| 2021/0354220 | A1* | 11/2021 | Credé | B23D 61/14 |

* cited by examiner

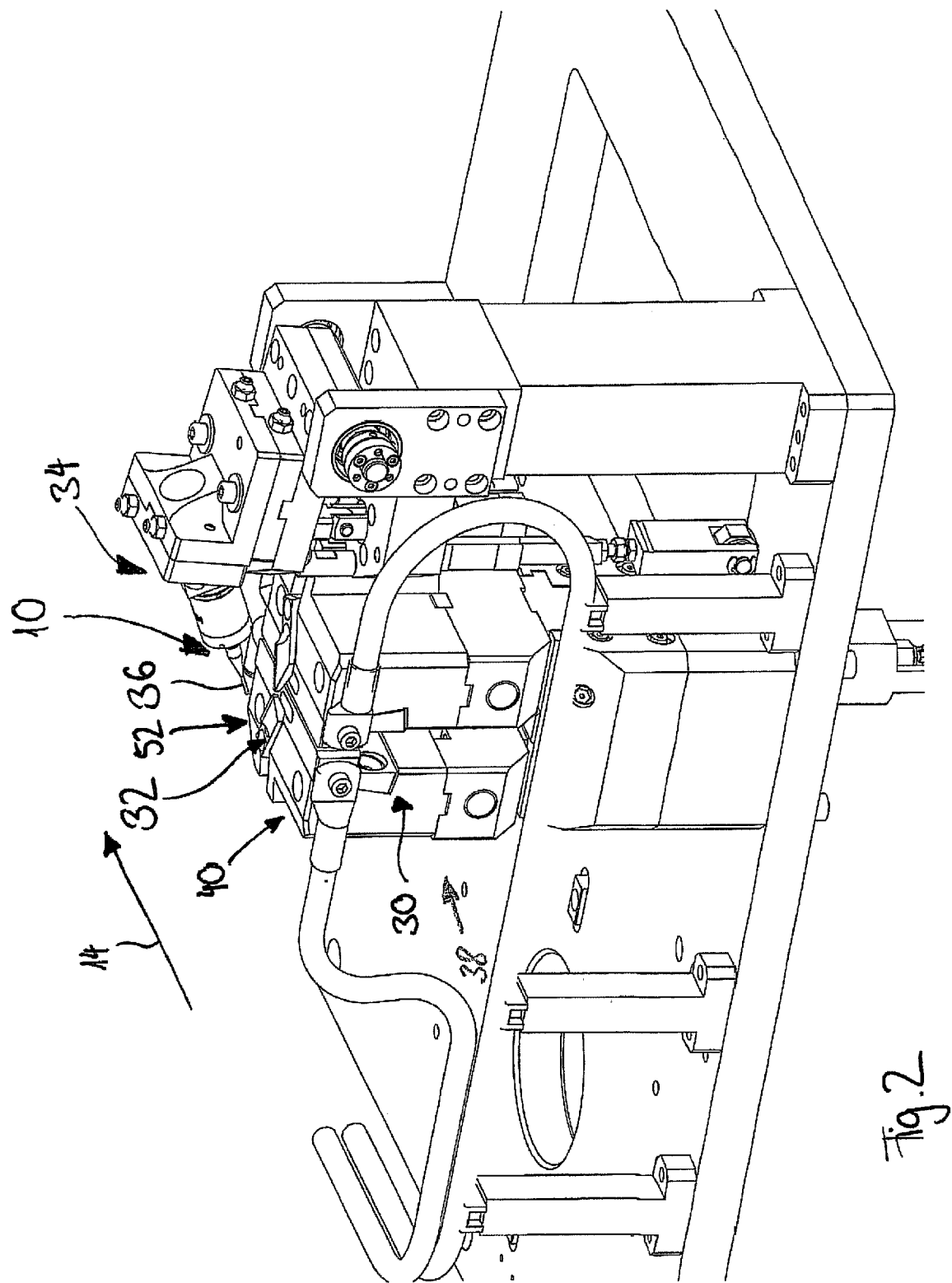

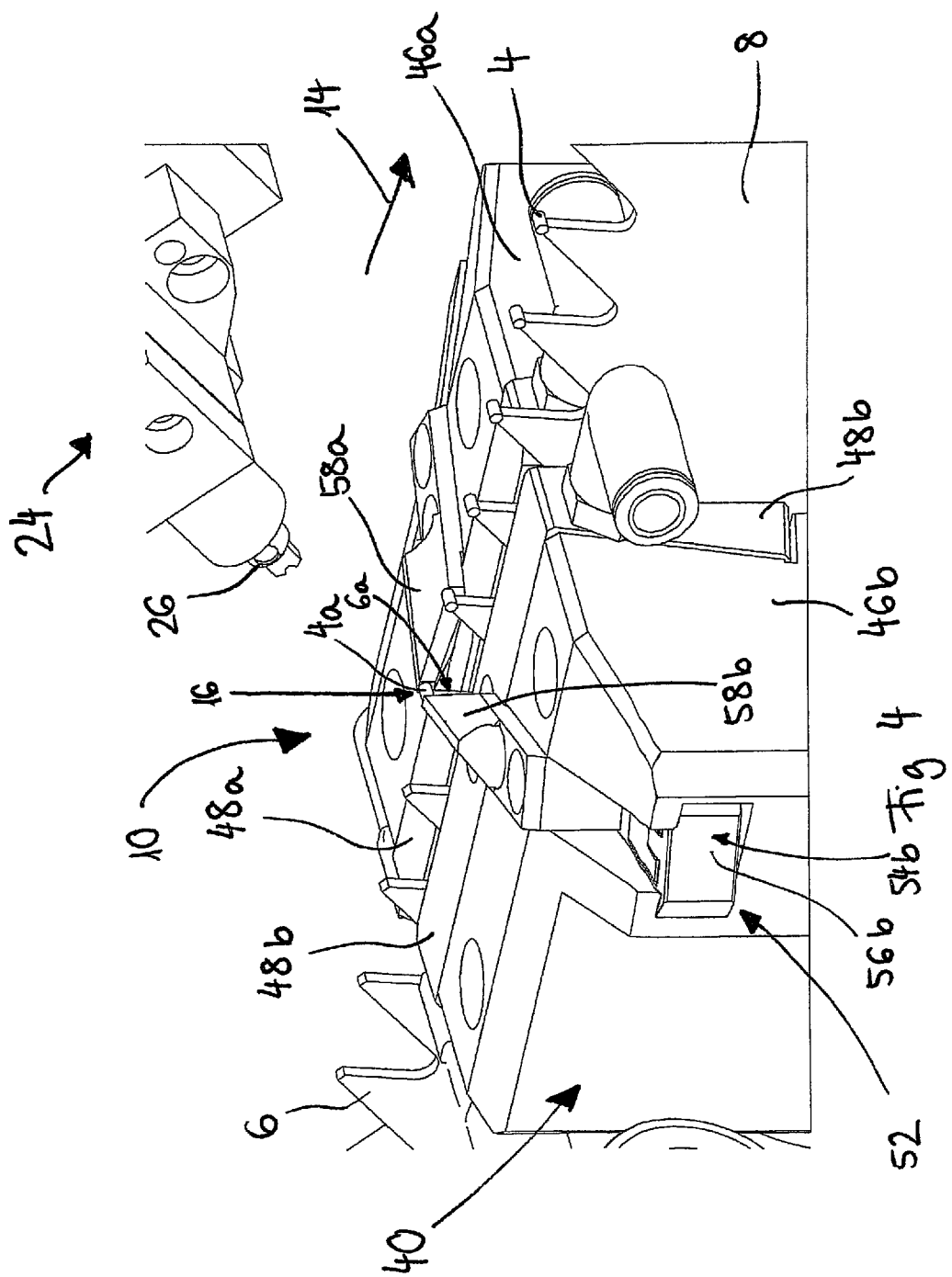

DEVICE AND METHOD FOR WELDING HARD MATERIAL ELEMENTS ONTO TEETH OF A SAW BLADE

BACKGROUND OF THE INVENTION

1. Field of Invention

The invention relates to a device for welding hard material elements onto teeth of a saw blade, in particular a band or circular saw blade, comprising a saw blade feed device for moving the saw blade in a feed direction, such that a respective intended tooth of the saw blade can be brought into a target position in a working region of the device, comprising a first centering device for centering the saw blade transversely to the feed direction and for fixing the saw blade while the hard material element is welded on, comprising a supply device for supplying a respective hard material element, comprising a second centering device for centering a respective hard material element transversely to the feed direction before the welding, comprising a resistance welding device having a welding electrode that can be deployed into the working region and can be withdrawn from the working region, the supply device being designed to supply and transfer a respective hard material element to the welding electrode, and it being possible for the welding electrode with the hard material element transferred thereto to be deployed into the working region in such a way that the hard material element can be brought toward the tooth in the target position to abut the tooth. Such a device is known for example from WO 2015/140345 A1. With this device, the problem of positioning the respective hard material element at a respective location of a tooth of the saw blade is solved by using an optical detection device by means of which the relative position of the saw blade and the welding electrode carrying the hard material element is detected and, using this detection, a controlled adjustment is carried out in order to bring the welding electrode with the hard material element held thereon to the intended location of the tooth of the saw blade. In the known device, the second centering device is assigned to the welding electrode, i.e. the hard material element is aligned or centered with respect to the welding electrode before it is supplied. A misalignment between the hard material element or welding electrode and the saw tooth then has to be corrected by the deployment movement of the welding electrode. The known device is therefore complex in that it requires a detection device and complex control processes for the various supply or deployment devices.

2. Description of Related Art

The problem addressed by the present invention is therefore that of developing a device of the type mentioned at the outset such that the supply and positioning actions are simpler and are realized with process and operational reliability.

SUMMARY OF THE INVENTION

This problem is solved according to the invention in a device of the type mentioned at the outset in that the hard material element abutting the tooth can be centered relative to the centered and fixed saw blade by means of the second centering device, and in that the first and the second centering device are provided in a common assembly, such that the centering of the saw blade by the first centering device predetermines a centering position for the subsequent centering of the hard material element by the second centering device.

Due to the fact that the first and the second centering device are provided in a common assembly and, in this way, the centering position for the hard material element is simultaneously predetermined by the centering action of the saw blade by means of the first centering device, the respective hard material element can be centered by the second centering device after being brought toward the tooth in the target position to abut the tooth; it is adjusted to the left/right in this process. The centering of the hard material element by means of the second centering device therefore takes place only after the hard material element has been brought toward the tooth in the target position to abut the tooth. The hard material element is thus moved, relative to the welding electrode holding it, to the left/right, that is to say transversely to the feed direction of the saw blade, into its centered position, which is already predetermined by the previous centering action of the saw blade by means of the first centering device. A mechanical, absolutely correct automatic positioning of the hard material element is thus achieved because its centering position is already predetermined by the previous centering of the saw blade by the first centering device.

First, the saw blade is transported by means of the saw blade feed device, so that a tooth is brought into the target position. When this target position is reached, the saw blade is centered by the first centering device and fixed in this position.

Following the centering and fixing of the saw blade, the welding electrode with the hard material element transferred thereto can then be deployed into the working region in such a way that the hard material element can be brought toward the tooth in the target position to abut the tooth, without requiring further positioning measures. Only then is the hard material element centered with respect to the previously centered saw blade by means of the second centering device.

When reference is made to hard material elements above, this is understood to mean an element of any geometry, in particular spherical, cylindrical or planar, made of a hard material, in particular hard metal, cermet, ceramic material or diamond, which is either a raw part or modified, in particular coated.

The first centering device for centering and fixing the saw blade could be formed by any actuators which center the saw blade to the left/right. It has also proven advantageous for the first centering device for centering and fixing the saw blade to comprise a first gripper arrangement having first gripper jaws that can be moved toward or away from one another transversely or obliquely to the feed direction. This is preferably a parallel gripper arrangement.

In a further development of this concept, the first gripper arrangement comprises a pull-down mechanism, so that the saw blade, with its band back facing away from the teeth, is brought into abutment with a support surface during the centering and fixing. In this way, when centering to the left/right, the saw band can also be positioned orthogonally thereto, in particular against a reference surface in the vertical direction.

The assembly also advantageously comprises at least one double-acting cylinder.

The second centering device arranged in the common assembly for centering a respective hard material element before the welding could in turn be formed by any actuators which are arranged on or at the first centering device such that their centering position is predetermined by the first centering device. The second centering device is preferably designed such that it comprises a second gripper arrangement having second gripper jaws that can be moved toward or away from one another transversely or preferably obliquely to the feed direction. The second gripper jaws of the second gripper arrangement are guided on the first gripper jaws of the first gripper arrangement.

The first and/or the second gripper jaws can be moved toward or away from one another via wedge hook or wedge surface gear mechanisms.

In addition, the wedge hook or wedge surface gear mechanisms comprise wedge slides which are guided in the first gripper jaws of the first centering device.

In order to move the saw blade incrementally further in the feed direction, so that a respective intended tooth of the saw blade is brought into the target position in the working region of the device, the saw blade feed device could be designed such that it moves to a defined position or against a predetermined end stop. In contrast, a measuring sensor device which interacts with the saw blade feed device is provided, such that a respective intended tooth of the saw blade can be brought into the target position in the working region by means of the saw blade feed device and using the measuring sensor device.

Advantageously, the measuring sensor device can come into contact with a tooth of the saw blade when the saw blade is moved in the feed direction. For this purpose, the measuring sensor device advantageously comprises a stylus, which in turn can be designed to be deflectable.

In addition, when the saw blade is moved in the feed direction, the measuring sensor device can advantageously come into contact with the tooth of the saw blade that is being moved to the target position. This has proven to be particularly advantageous because it can increase the positioning accuracy. There are in particular production-related tolerances in the formation of the individual saw teeth on a saw blade. Because the measuring sensor device interacts with the tooth that is to be brought into the target position in order to position the saw blade, the effect of such tolerances on the positioning accuracy is reduced.

It is further advantageous for the measuring sensor device to come into contact with the tooth close to the region of the tooth to which the hard material element is to be welded.

It has also proven to be advantageous for the measuring sensor device, in particular with its stylus, to be inserted into and withdrawn from a tooth gap transversely to the feed direction. This adjusting movement can take place with components transverse to the plane of the saw blade and/or in the plane of the saw blade. This can be done advantageously by means of an electromagnetic linear drive.

Furthermore, the measuring sensor device, in particular its stylus, can be deflected in the feed direction while the measuring operation is being carried out.

Furthermore, a device for monitoring and detecting the welding action can be provided.

In this case, it has proven advantageous that, when the second gripper jaws of the second gripper arrangement are reset, an uncovered direct optical and/or thermal detection by the device for monitoring and detecting the welding action is made possible.

It has also proven advantageous for the welding electrode to be designed to magnetically hold the hard material element transferred thereto.

The welding electrode can thus comprise a permanent magnet or an electromagnet. The magnetic field strength is advantageously selected such that the hard material element is held securely on the welding electrode, but is nevertheless centered by the second centering device, i.e. it can be shifted slightly with respect to the welding electrode. After the hard material element has been welded on, the welding electrode has to be able to be detached without any problems.

In the context of this invention, protection is independently claimed for the concept of magnetically holding a magnetizable hard material element on the welding electrode, i.e. in particular for a device for welding hard material elements onto teeth of a saw blade, in particular a band or circular saw blade, comprising a saw blade feed device for moving the saw blade in a feed direction, such that a respective intended tooth of the saw blade can be brought into a target position in a working region of the device, a first centering device for centering the saw blade transversely to the feed direction and for fixing the saw blade while the hard material element is welded on, a supply device for supplying a respective hard material element, comprising a second centering device for centering a respective hard material element transversely to the feed direction before the welding, a resistance welding device having a welding electrode that can be deployed into the working region and can be withdrawn from the working region, the supply device being designed to supply and transfer a respective hard material element to the welding electrode, and it being possible for the welding electrode with the hard material element transferred thereto to be deployed into the working region in such a way that the hard material element can be brought toward the tooth in the target position to abut the tooth, wherein the welding electrode is designed to magnetically hold the hard material element transferred thereto.

The invention also relates to a method for welding hard material elements onto teeth of a saw blade using the device described above, wherein the method comprises the following steps:

supplying the saw blade in a feed direction by means of the saw blade feed device;

bringing a respective intended tooth of the saw blade into a target position in a working region of the device;

centering the saw blade by means of the first centering device transversely to the feed direction;

fixing the saw blade by means of the first centering device;

supplying and transferring a respective hard material element to a welding electrode by means of the supply device, deploying the welding electrode together with the hard material element transferred thereto into the working region; centering the respective hard material element brought into the working region by means of the second centering device transversely to the feed direction before the welding, welding the hard material element onto the tooth in the target position in the working region;

withdrawing the welding electrode from the working region;

wherein a centering position for the centering of the hard material element by the second centering device is predetermined by the centering of the saw blade by the first centering device, such that, when centering the respective hard material element transversely to the feed direction, the hard material element is centered relative to the previously centered and fixed saw blade.

Further advantages, features and details of the invention can be found in the dependent claims and in the following description, in which a preferred embodiment is described in detail with reference to the drawings. The features shown in the drawings and mentioned in the claims and in the description may in each case be essential to the invention individually or in any desired combination. In the drawings:

BRIEF DESCRIPTION OF THE DRAWING

FIG. 2 shows a detail of the device according to the invention according to FIG. 1a without a saw blade;

DETAILED DESCRIPTION OF THE BEST MODE OF THE INVENTION

Figure 1A:
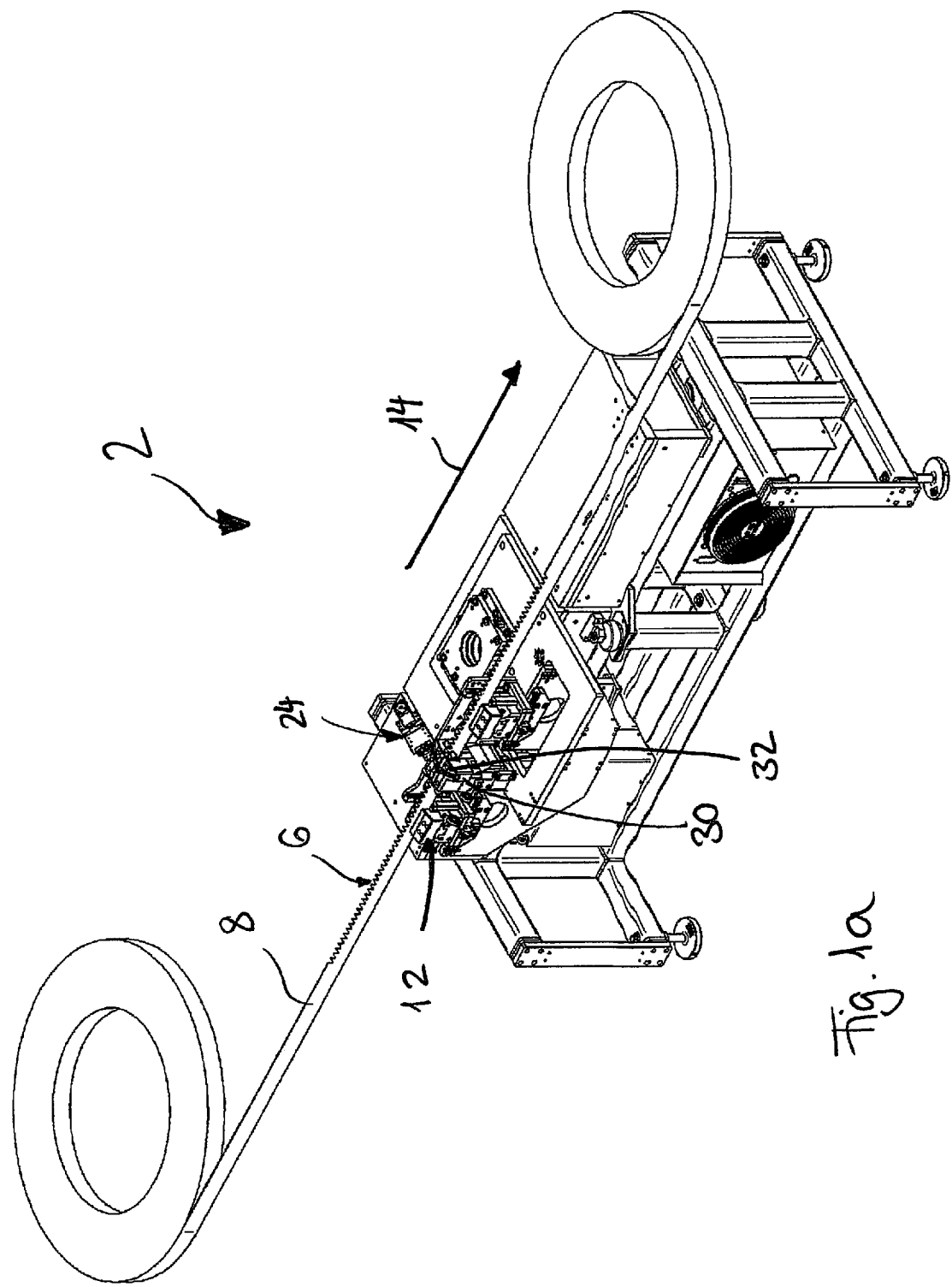
FIG. 1a is a perspective view of the device according to the invention with a saw blade.
Figure 1B:
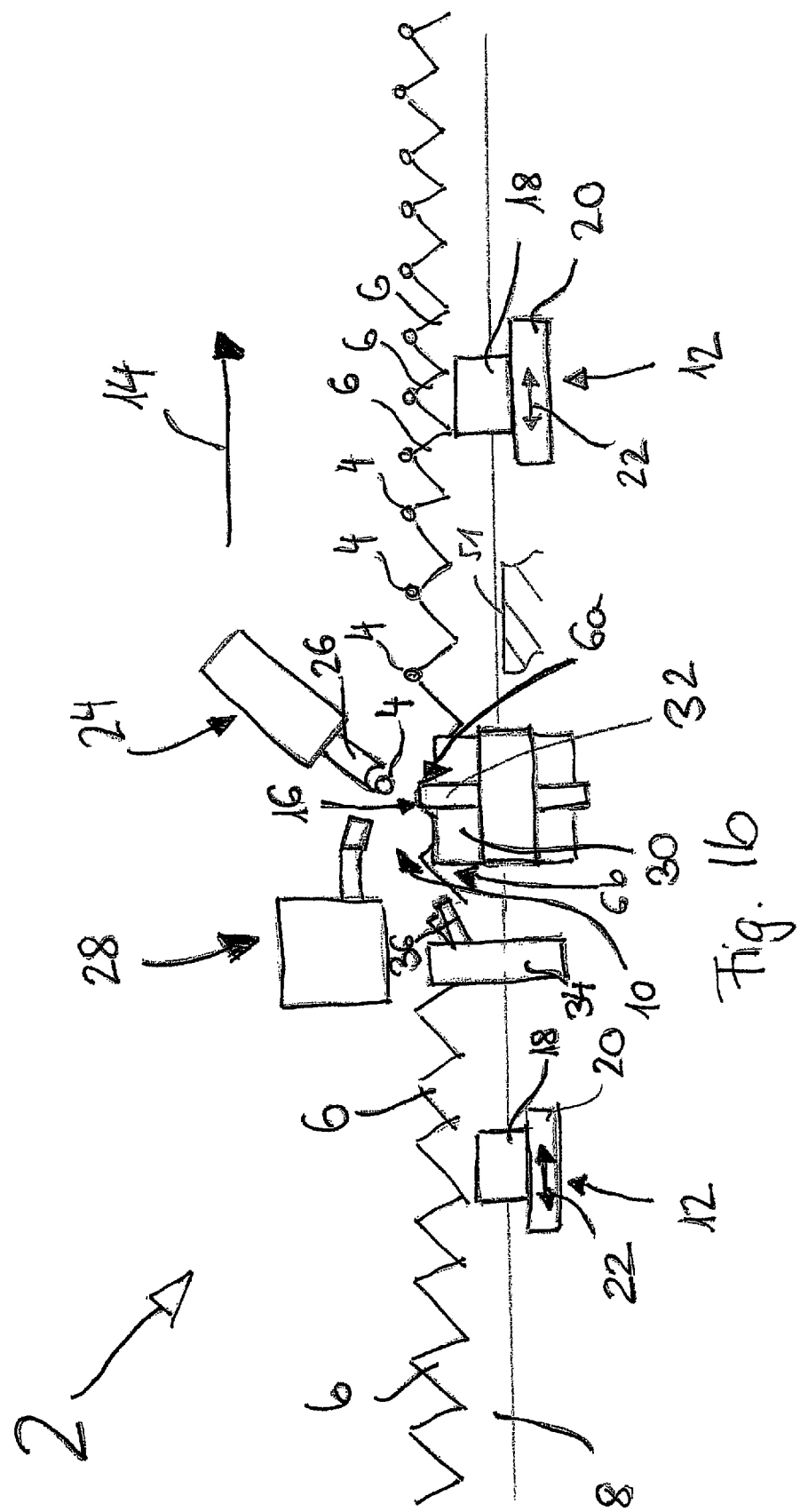
FIG. 1b is a schematic view of the device according to the invention according to FIG. 1a with a saw blade.

FIGS. 1a and 1b schematically show a perspective view of the device according to the invention, designated as a whole by reference number 2, for welding hard material elements 4 onto teeth 6 of a saw blade 8. In the embodiment shown, the saw blade 8 is a band saw blade. The invention can also be applied to circular saw blades.

The hard material elements 4 are welded onto the teeth 6 of the saw blade 8 in a working region 10 of the device 2. For this purpose, the saw blade 8 is moved in the feed direction 14 by means of a saw blade feed device 12, such that a respective intended tooth 6a of the saw blade 8 can be brought into a target position 16 in the working region 10 of the device 2.

According to the embodiment shown, the saw blade feed device 12 comprises gripping or clamping devices 18 for grasping the saw blade 8, which are mounted on feed carriages 20. The feed carriages 20 can be moved, for example by means of a drive, in the direction of the double arrow 22 in parallel with the feed direction 14. The drive is preferably an electric linear drive.

For welding the hard material elements 4 onto the teeth 6 of the saw blade 8, the device 2 comprises a resistance welding device 24 having a welding electrode 26 which can be deployed into the working region 10 and withdrawn from the working region 10. Using a supply device 28, a respective hard material element 4 is supplied to the welding electrode 26 and transferred thereto. The welding electrode 26 with the hard material element 4 transferred thereto is deployed into the working region 10 of the device 2, and the hard material element 4 is brought toward the tooth 6a, in the target position 16, of the saw blade 4, namely until abutment with the tooth 6a.

Using a first centering device 30, before the welding action the saw blade 8 is centered transversely to the feed direction 14 and fixed in the centered position. A second centering device 32 is used to center the respective hard material element 4 transversely to the feed direction 14 before welding onto the respective intended tooth 6a, in the target position, of the saw blade 8. The mode of operation and the structure of the first and the second centering device 30, 32 are explained below with reference to FIGS. 2 and 3a to 3d. After the welding action has ended, the saw blade 8 is moved further in the feed direction 14 by means of the saw blade feed device 12, so that a subsequent tooth 6b can be brought into the target position 16.

FIG. 2 shows a detail or a partial view of the device 2 according to the invention according to FIG. 1; further components which are not of immediate interest are omitted for better understanding. The detail shown shows the working region 10, the first centering device 30, the second centering device 32 and a measuring sensor device 34. By means of the measuring sensor device 34, a respective intended tooth 6a of the saw blade 8 is brought into the target position 16 or it is ensured that a respective intended tooth 6a of the saw blade is in the target position. For this purpose, the measuring sensor device 34 can be inserted into and withdrawn from a tooth gap of the saw blade 8 located in the working region 10. When the saw blade 8 is moved by the saw blade feed device 12 in the feed direction 14, the measuring sensor device 34 positioned in the working region comes into contact with a tooth 6 of the saw blade 8 and a stylus 36 of the measuring sensor device 34 is deflected in the feed direction 14. The measuring sensor device 34 further comprises a sensor (not shown) which detects the deflection of the stylus 36. The deflection of the stylus 36 of the measuring sensor device 34 can be used to determine whether the respective intended tooth 6a of the saw blade 8 is in the target position 16. When the target position 16 is reached, the feed of the saw blade 8 by the saw blade feed device 12 is interrupted, and the saw blade 8 is centered and fixed transversely to the feed direction 14 by the first centering device 30, preferably until the end of the upcoming welding action.

FIGS. 2 and 3a to 3c show an assembly that is designated as a whole by reference number 38. The assembly 38 comprises the first centering device 30 for centering the saw blade 8 and the second centering device 32 for centering a respective hard material element 4.

The first centering device 30 comprises a first gripper arrangement 40 having first gripper jaws 44a, 44b that can be moved toward or away from one another transversely to the feed direction 14 in the direction of the double arrow 42, for gripping the saw blade 8. The gripping movement of the first gripper jaws 44a, 44b is converted, for example, from an actuating movement of an in particular double-acting cylinder via a wedge hook gear mechanism into a movement in the direction of the double arrow 42.

According to the embodiment shown here, the gripper jaws 44a, 44b comprise base jaws 46a, 46b and electrically conductive gripper jaw inserts 48a, 48b. The gripper jaw inserts 48a, 48b contact the saw blade 8 during the welding action. To derive the welding current, the gripper jaw inserts 48a, 48b are connected via electrical terminals 50 to electrical lines via which the welding current is conducted.

The first centering device 30 further comprises a pull-down mechanism. Via the pull-down mechanism, during the gripping and fixing by means of the first gripper jaws 44a, 44b the saw blade 8 is brought into abutment with a support surface 51, which is only shown schematically in FIG. 1b and is located between the first gripper jaws 44a, 44b.

The second centering device 32 comprises a second gripper arrangement 52 having second gripper jaws 54a, 54b, the second gripper jaws being guided in the gripper jaws 44a, 44b.

According to the embodiment shown here, the gripper jaws 54a, 54b can be moved toward or away from one another obliquely to the feed direction 14. According to the embodiment shown here, the second gripper jaws 54a, 54b comprise second base jaws 56a, 56b and gripper fingers 58a, 58b for grasping and centering the hard material element 4.

According to the embodiment shown here, the second centering device 32 comprises a double-acting cylinder 60.

An actuating movement caused by the double-acting cylinder 60 is transmitted to wedge hook gear mechanisms 64a, 64 via a cylinder bridge 62. The wedge hook gear mechanisms 64a, 64b convert the actuating movement of the double-acting cylinder 60 into the gripping movement of the second gripper jaws 54a, 54b, in the present example obliquely to the feed direction 14, but in particular and preferably orthogonally to the actuating movement of the double-acting cylinder 60. It would also be conceivable for the actuating movement to be generated by drive means other than a double-acting cylinder.

Figure 3A:
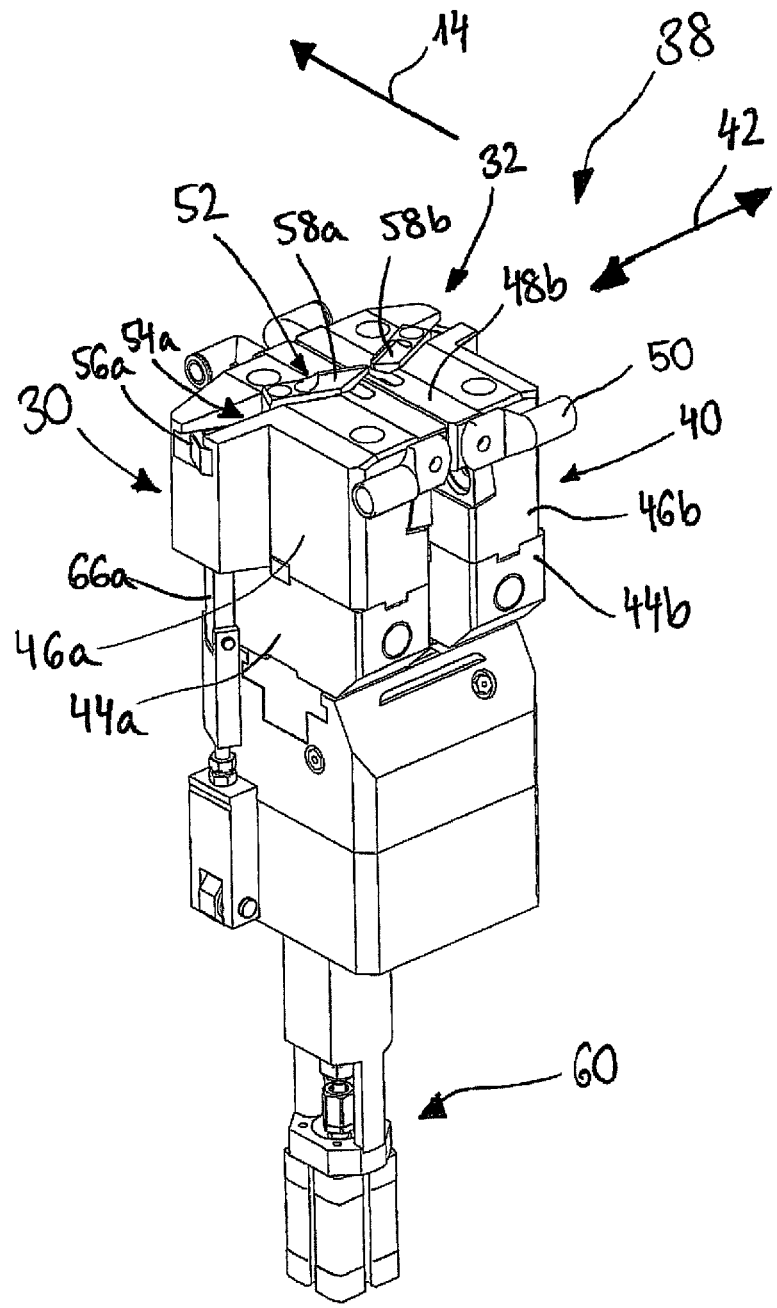
FIGS. 3a to 3d show different views of an assembly of the device according to the invention according to FIG. 1a, and FIG. 4 shows a further detail of the device according to the invention according to FIG. 1a with a saw blade.
Figure 3B:
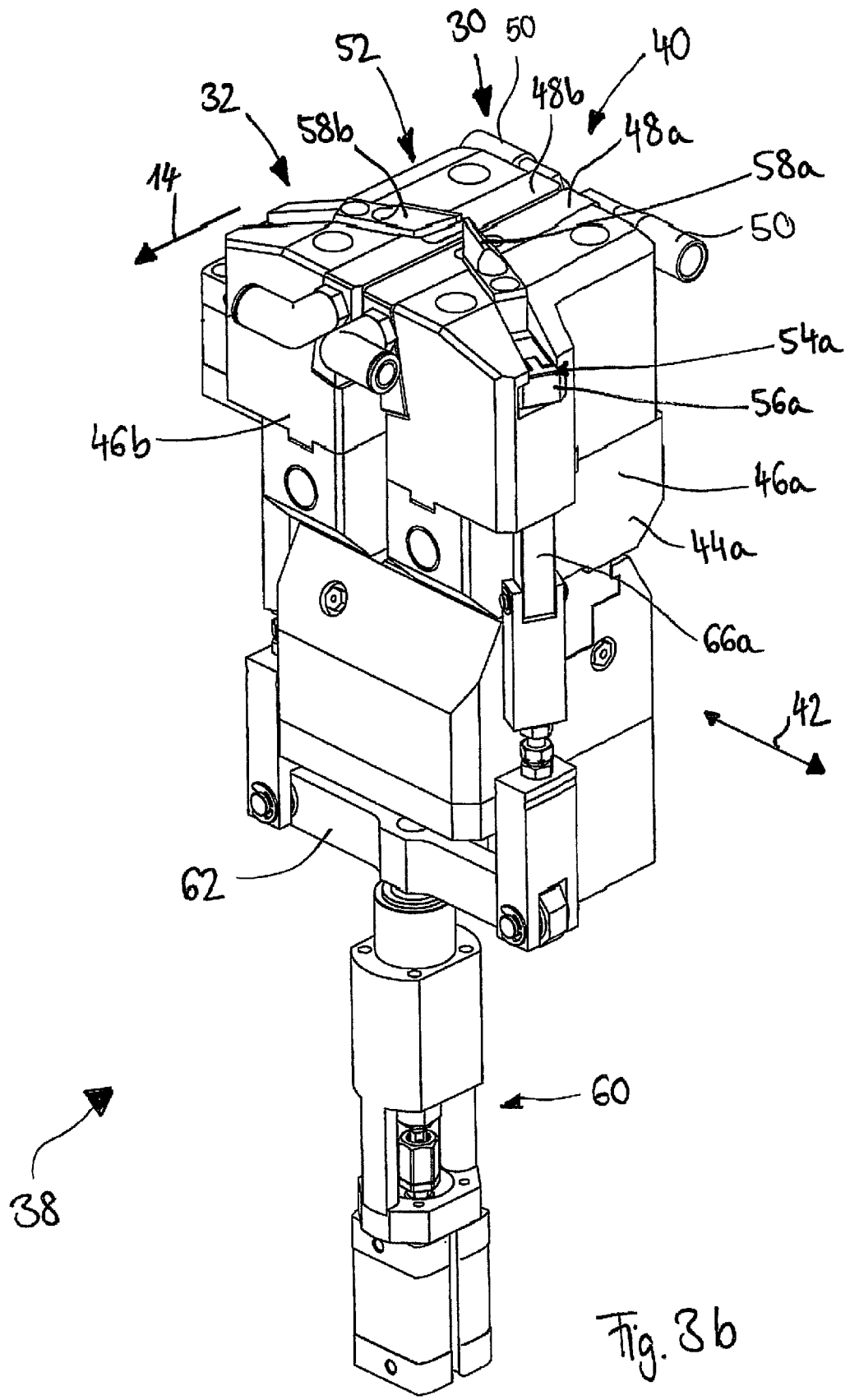
Figure 3C:
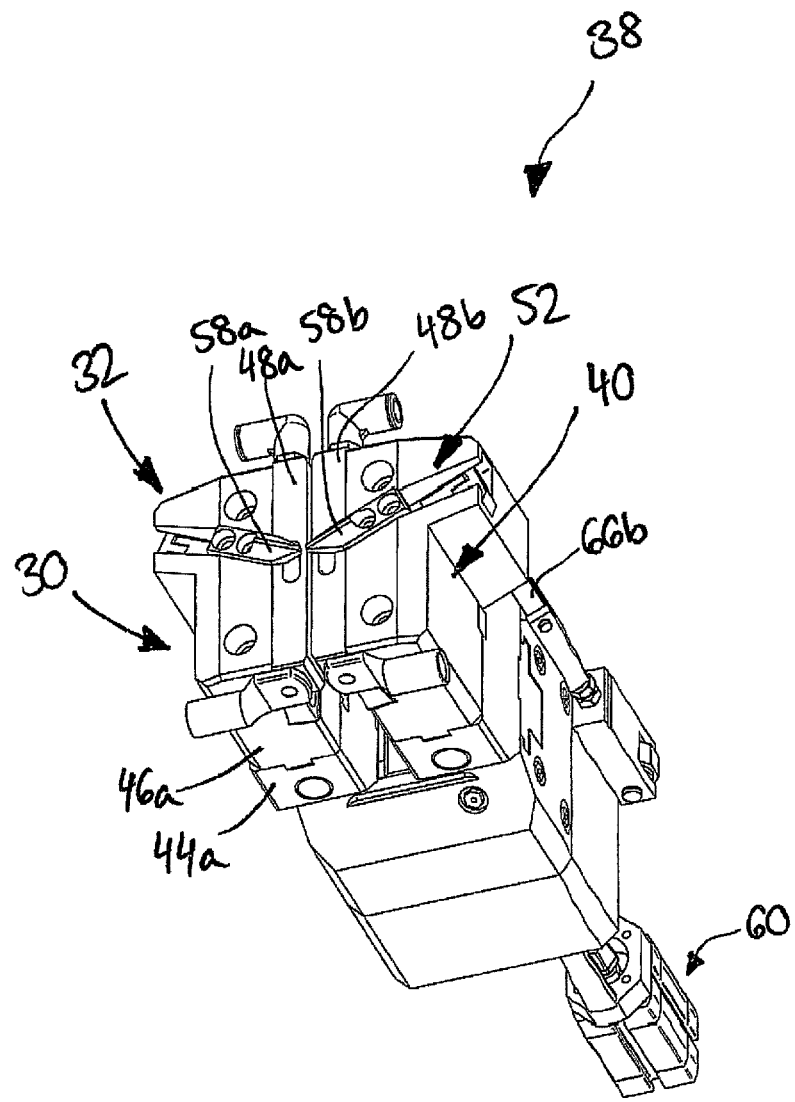
Figure 3D:
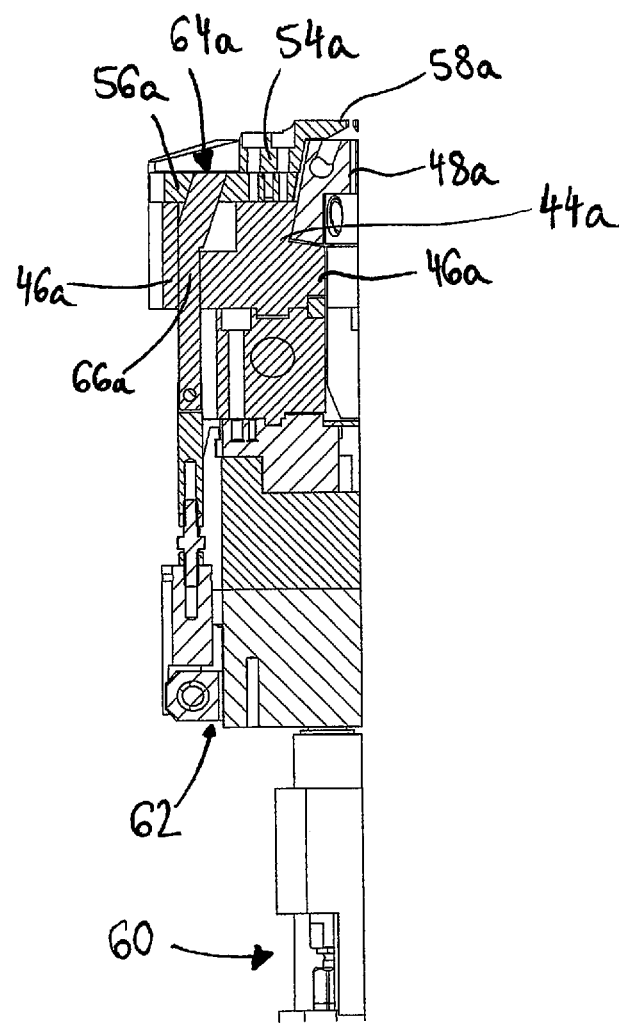

It can be seen from FIGS. 3a to 3c that the second gripper jaws 54a, 54b of the second gripper arrangement 52 are guided on the first gripper jaws 44a, 44b of the first gripper arrangement 40. FIG. 3d shows a halved sectional view of the assembly 38. A wedge slide 66a of the wedge hook gear mechanism 64a of the second gripper arrangement 52 is guided in the first gripper jaws 44a of the first gripper arrangement 40. In this way, the second centering device 32 is centered relative to the first centering device 30, transversely to the feed direction. The centering of the saw blade 8 by the first centering device 30 thus simultaneously predetermines a centering position for the centering of the hard material element 4 by the second centering device 32.

FIG. 4 shows a detail of the device 2 according to the invention according to FIG. 1 with a saw blade 8 and a hard material element in the target position. The detail shown shows the working region 10 of the device 2. The tooth 6a of the saw blade 8 is in the target position 16. The saw blade 8 is received between the gripper jaw inserts 48a, 48b of the first gripper arrangement 40 of the first centering device 30 and centered and fixed transversely to the feed direction 14. The hard material element 4a is arranged between the gripper fingers 58a, 58b of the second gripper arrangement 52 of the second centering device 32. The welding electrode 26 of the resistance welding device is shown withdrawn from the working region for a better representation of the hard material element. In normal operation, the welding electrode 26 contacts the hard material element and holds it against the tooth in question, while the gripper fingers 58a, 58b border the hard material element on both sides and thus center it with respect to the saw blade plane. After this centering has been carried out, the gripper fingers 58a, 58b move back and the welding action is then carried out.

The invention claimed is:

1. Device (2) for welding hard material elements (4) onto teeth (6) of a saw blade (8), including a band or circular saw blade, comprising:
a saw blade feed device (12) for moving the saw blade (8) in a feed direction (14), such that a respective intended tooth (6a) of the saw blade (8) can be brought into a target position (16) in a working region (10) of the device (2),
a first centering device (30) for centering the saw blade (8) transversely to the feed direction (14) and for fixing the saw blade (8) while a respective hard material element (4) is welded on,
a supply device (28) for supplying the respective hard material element (4),
a second centering device (32) for centering the respective hard material element (4) transversely to the feed direction (14) before the welding,
a resistance welding device (24) having a welding electrode (26) that can be deployed into the working region (10) and withdrawn from the working region (10),
the supply device (28) being configured to supply and transfer the respective hard material element (4) to the welding electrode (26), and deploy the welding electrode (26) with the respective hard material element (4) transferred thereto into the working region (10) so that the respective hard material element (4) can be brought toward the respective intended tooth (6a) in the target position (16) to abut the respective intended tooth (6a), characterized in that
the second centering device (32) is configured to center the respective hard material element (4) abutting the respective intended tooth (6a) relative to the centering of the fixed saw blade (8), and
the first centering device (30) and the second centering device (32) are provided in a common assembly (38), such that the centering of the saw blade (8) by the first centering device (30) predetermines a centering position for a subsequent centering of the respective hard material element (4) by the second centering device (32).

2. Device (2) according to claim 1, characterized in that the first centering device (30) for centering and fixing the saw blade (8) comprises a first gripper arrangement (40) having first gripper jaws (44a, 44b) configured to move toward or away from one another transversely or obliquely to the feed direction (14).

3. Device (2) according to claim 2, characterized in that the first gripper arrangement (40) comprises a pull-down mechanism, so that the saw blade (8) that has a band back facing away from the teeth (6), is brought into abutment with a support surface during the centering and fixing of the saw blade (8).

4. Device (2) according to claim 1, characterized in that the common assembly (38) comprises at least one double-acting cylinder (60).

5. Device (2) according to claim 1, characterized in that the second centering device (32) for centering the respective hard material element (4) before the welding comprises a second gripper arrangement (52) having second gripper jaws (54a, 54b) configured to move toward or away from one another transversely or obliquely to the feed direction (14).

6. Device (2) according to claim 5, characterized in that the second gripper jaws (54a, 54b) are configured to guide on the first gripper jaws (44a, 44b).

7. Device (2) according to claim 5, characterized in that either the first gripper jaws (44a, 44b), or the second gripper jaws (54a, 54b), or both, is configured to move toward or away from one another via wedge hook or wedge surface gear mechanisms (64a, 64b).

8. Device (2) according to claim 7, characterized in that the wedge hook or wedge surface gear mechanisms (64a, 64b) comprise wedge slides (66a, 66b) which are guided in the first gripper jaws (44a, 44b) of the first centering device (30).

9. Device (2) according to claim 1, characterized in that the device comprises a measuring sensor device (34) configured to interact with the saw blade feed device (12), such that a respective intended tooth (6) of the saw blade (8) can be brought into the target position (16) in the working region (10) by means of the saw blade feed device (12) and using the measuring sensor device (34).

10. Device (2) according to claim 9, characterized in that the measuring sensor device (34) is configured to come into contact with a corresponding tooth (6) of the saw blade (8) when the saw blade (8) is moved in the feed direction (14).

11. Device (2) according to claim 10, characterized in that, when the saw blade (8) is moved in the feed direction (14), the measuring sensor device (34) is configured to come into contact with the corresponding tooth (6) of the saw blade (8) that is being moved to the target position (16).

12. Device (2) according to claim 11, characterized in that the measuring sensor device (34) is configured to come into contact with the corresponding tooth (6) close to the region of the corresponding tooth (6) to which the respective hard material element (4) is to be welded.

13. Device (2) according to claim 9, characterized in that the measuring sensor device (34) is configured to insert into and withdraw from a tooth gap transversely to the feed direction (14).

14. Device (2) according to claim 9, characterized in that the measuring sensor device (34) is configured to deflect in the feed direction (14) while a measuring operation is being carried out.

15. Device (2) according to claim 1, characterized in that the device comprises a monitoring and detecting device configured for monitoring and detecting the welding action of the device.

16. Device (2) according to claim 15, characterized in that, when the second gripper jaws (54a, 54b) are reset, the monitoring and detecting device is configured to make an uncovered direct optical and/or thermal detection.

17. Device (2) according to claim 1, characterized in that the welding electrode (26) is configured to magnetically hold the respective hard material element (4) transferred thereto.

18. Method for welding hard material elements (4) onto teeth (6) of a saw blade (8) using a device (2) according to claim 1, characterized in that the method comprises the following steps:
   supplying the saw blade (8) in a feed direction (14) by means of the saw blade feed device (12);
   bringing a respective intended tooth (6a) of the saw blade (8) into a target position (16) in a working region (10) of the device (2);
   centering the saw blade (8) by means of the first centering device (30) transversely to the feed direction (14);
   fixing the saw blade by means of the first centering device (30);
   supplying and transferring the respective hard material element (4) to a welding electrode (26) by means of the supply device (28),
   deploying the welding electrode (26) together with the respective hard material element (4) transferred thereto into the working region (10);
   centering the respective hard material element (4) brought into the working region by means of the second centering device (32) transversely to the feed direction before the welding,
   welding the respective hard material element (4) onto the tooth (6a) in the target position (16) in the working region;
   withdrawing the welding electrode (26) from the working region (10);
characterized in that
   a centering position for the centering of the respective hard material element (4) by the second centering device (32) is predetermined by the centering of the saw blade (8) by the first centering device (30), such that, when centering the respective hard material element (4) transversely to the feed direction (14), the respective hard material (4) element is centered relative to the previously centered and fixed saw blade (8).

19. Device (2) according to claim 2, characterized in that the common assembly (38) comprises at least one double-acting cylinder (60).

20. Device (2) according to claim 2, characterized in that the second centering device (32) for centering the respective hard material element (4) before the welding comprises a second gripper arrangement (52) having second gripper jaws (54a, 54b) configured to move toward or away from one another transversely or obliquely to the feed direction (14).

* * * * *